A. Foubert.
Making Vinegar.

No. 75404.  Patented Mar. 10, 1868.

Witnesses
Chas. H. Smith
Geo. D. Walker

Inventor
A. Foubert
per L. W. Serrell
Atty

United States Patent Office.

ANDRE FOUBERT, OF NEW YORK, N. Y.

Letters Patent No. 75,404, dated March 10, 1868.

IMPROVEMENT IN THE MANUFACTURE OF VINEGAR.

*The Schedule referred to in these Letters Patent and making part of the same.*

TO ALL WHOM IT MAY CONCERN:

Be it known that I, ANDRE FOUBERT, of the city and State of New York, have invented and made a certain new and useful Improvement in the Manufacture of Vinegar; and I do hereby declare the following to be a full, clear, and exact description of the said invention, reference being had to the annexed drawings, making part of this specification, wherein—

The same parts are marked with corresponding letters.

Figure 1:
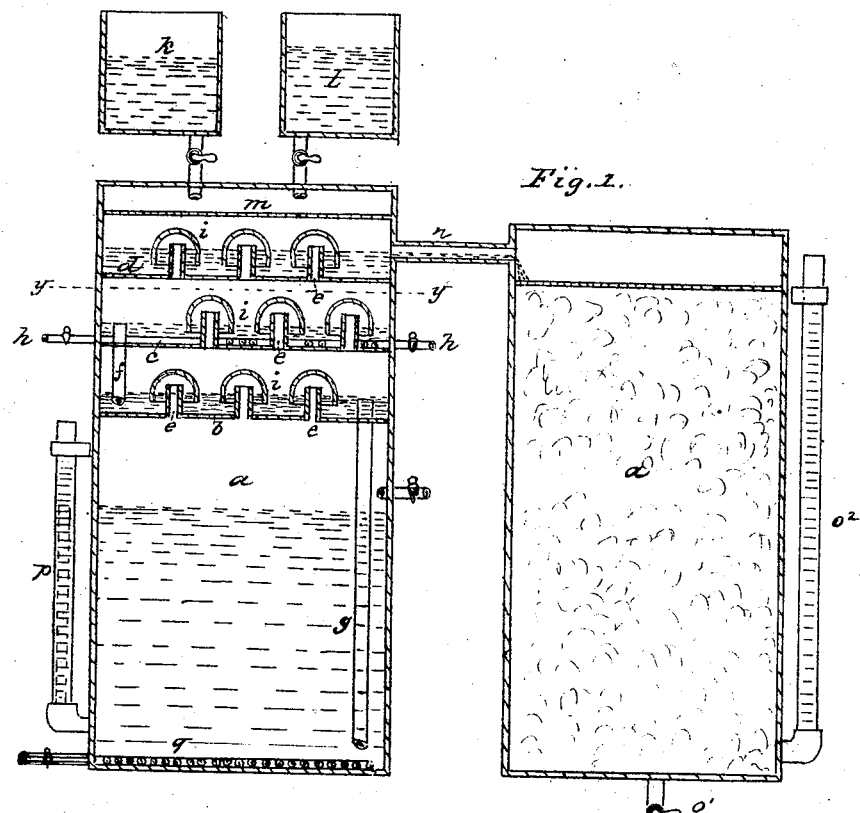
Figure 1 is a vertical section of the apparatus employed by me.
Figure 2:
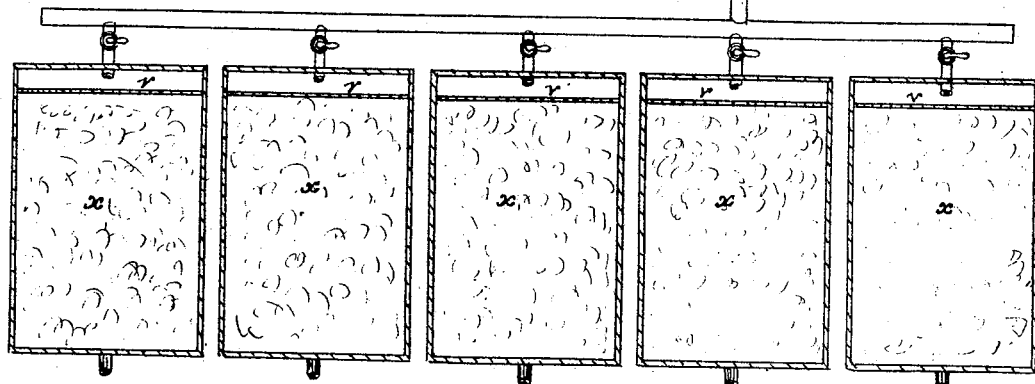
Figure 2 is a sectional plan at the line $y\ y$.
Figure 2:
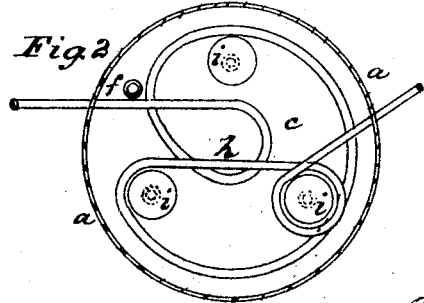

In Letters Patent granted to me, March 19, 1867, an apparatus for manufacturing vinegar is shown, in which the vapors from the mash or light-wines are condensed by water and a small proportion of vinegar or acetic acid, and trickle over shavings for exposing the liquid to the atmosphere and forming vinegar.

My present invention is an improvement upon the said invention, and consists in a tub in which are evaporated the light-wines from mash or shavings, or other fermented material, said tub containing concentrating-platforms and a screen that admits a shower of acidulated water to condense the vapors. The liquid runs out by a pipe, and flows over the shavings in a vat, so that the liquid is turned into strong vinegar.

The operation of this apparatus corresponds generally with that in said patent, but the construction is different.

In the drawing, $a$ is a tub, in which are the platforms $b$, $c$, and $d$, having vapor-tubes $e$ and caps $i$, and $f$ and $g$ are return-tubes to the tub; $h$ is a coil, supplied with water to cool the liquid on the platform $c$. $k$ is a vessel containing vinegar, and $l$ is the vessel for water, and $m$ is a perforated plate or sprinkler. $n$ is the pipe to the shavings-tub $o$.

The mash, wine, or wash is introduced into the tub $a$ to the desired height, indicated by the glass gauge $p$. Steam is admitted to the coil $q$, and the evaporation passes through the vapor-tubes $e$, and the liquid upon the platforms $b$ and $c$, which condenses the essential oils and more watery portions, which are returned to the tub.

The uncondensed vapors passing into the liquid on the platform $d$ warm the same, and are finally condensed by the shower from the perforated plate $m$; the liquid then passes in a warm condition into the shavings-tub $o$.

The proportion of vinegar from the vessel $k$, and water from the vessel $l$, is to be regulated by the cocks, and I find practically that the production of a superior quality of vinegar with a small supply of vinegar from the vessel $k$ is insured, and that the use of any other acid than acetic is unnecessary.

The tub $o$, containing the shavings, may be of any desired size, and the liquid retained therein by the cock $o^1$, a glass tube, $o^2$, indicating the quantity, and allowing an escape of air from the tub.

From the tub $o$ the vinegar is allowed to flow over shavings in any desired number of tubs, according to the strength required. I have shown the tubs $x\ x\ x\ x\ x$, each provided with a perforated plate at $v$, to cause the liquid to be evenly distributed over the shavings.

What I claim, and desire to secure by Letters Patent, is—

An evaporating-tub containing platforms and vapor-tubes, in combination with the apparatus for supplying water and vinegar, and with the vat containing shavings, substantially as and for the purposes set forth.

In witness whereof, I have hereunto set my signature, this first day of February, 1868.

A. FOUBERT.

Witnesses:
 CHAS. H. SMITH,
 GEO. D. WALKER.